(12) United States Patent
Kwon et al.

(10) Patent No.: US 9,172,380 B2
(45) Date of Patent: Oct. 27, 2015

(54) METHOD AND APPARATUS FOR SUPPORTING SELF-DESTRUCTION FUNCTION IN BASEBAND MODEM

(71) Applicant: Samsung Electronics Co., Ltd., Suwon-si, Gyeonggi-do (KR)

(72) Inventors: Yun Ju Kwon, Yongin-si (KR); In Yup Kang, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/322,498

(22) Filed: Jul. 2, 2014

(65) Prior Publication Data

US 2015/0008955 A1    Jan. 8, 2015

Related U.S. Application Data

(60) Provisional application No. 61/843,012, filed on Jul. 4, 2013.

(30) Foreign Application Priority Data

Mar. 5, 2014    (KR) ...................... 10-2014-0025835

(51) Int. Cl.
| | | |
|---|---|---|
| *G06F 21/75* | (2013.01) | |
| *G06F 21/76* | (2013.01) | |
| *G06F 9/52* | (2006.01) | |
| *H03K 19/177* | (2006.01) | |

(52) U.S. Cl.
CPC .......... *H03K 19/17768* (2013.01); *G06F 21/75* (2013.01); *G06F 21/76* (2013.01); *G06F 9/526* (2013.01)

(58) Field of Classification Search
CPC .......... G06F 21/76; G06F 21/75; G06F 9/52; G06F 9/526; G06F 9/30067; G06F 9/30286; H03K 19/17768
USPC ........................ 326/8; 710/200; 711/164, 163
See application file for complete search history.

(56) References Cited

U.S. PATENT DOCUMENTS

| | | | | |
|---|---|---|---|---|
| 5,572,696 | A * | 11/1996 | Sonobe .......................... | 711/202 |
| 5,758,121 | A * | 5/1998 | Fukuzumi ..................... | 711/164 |
| 6,480,699 | B1 * | 11/2002 | Lovoi ........................... | 455/41.2 |
| 7,020,019 | B2 * | 3/2006 | Salessi et al. ............ | 365/185.04 |
| 8,159,259 | B1 * | 4/2012 | Lewis et al. ...................... | 326/8 |
| 8,429,420 | B1 * | 4/2013 | Melvin ......................... | 713/189 |
| 8,896,346 | B1 * | 11/2014 | Lewis et al. ..................... | 326/41 |
| 2002/0124178 | A1 * | 9/2002 | Kocher et al. ................ | 713/193 |
| 2006/0242465 | A1 * | 10/2006 | Cruzado et al. ................ | 714/30 |
| 2011/0270179 | A1 * | 11/2011 | Ouyang et al. ................ | 604/110 |
| 2012/0194564 | A1 * | 8/2012 | White et al. .................. | 345/690 |

* cited by examiner

*Primary Examiner* — Dylan White
(74) *Attorney, Agent, or Firm* — Jefferson IP Law, LLP

(57) ABSTRACT

A method and an apparatus for supporting a self-destruction function in a baseband modem are provided. Aspects of the present disclosure are to address at least the above-mentioned problems and/or disadvantages and to provide at least the advantages described below. Accordingly, an aspect of the present disclosure is to provide a self-destruction method and apparatus in which a self-impossible state is autonomously entered if the baseband modem of a receiving terminal which supports mobile communication is necessary. Another aspect of the present disclosure is to provide a method and apparatus for deleting information stored in memory when a command is received over a mobile communication network in which a baseband modem has been constructed and then entering a self-impossible state so that the terminal is not recovered although it is booted up again.

21 Claims, 4 Drawing Sheets

METHOD AND APPARATUS FOR SUPPORTING SELF-DESTRUCTION FUNCTION IN BASEBAND MODEM

CROSS-REFERENCE TO RELATED APPLICATION(S)

This application claims the benefit under 35 U.S.C. §119 (e) of a U.S. Provisional application filed on Jul. 4, 2013 in the U.S. Patent and Trademark Office and assigned Ser. No. 61/843,012, and under 35 U.S.C. §119(a) of a Korean patent application filed on Mar. 5, 2014 in the Korean Intellectual Property Office and assigned Serial number 10-2014-0025835, the entire disclosure of each of which is hereby incorporated by reference.

TECHNICAL FIELD

The present disclosure relates to a method and apparatus for supporting a self-destruction function in a baseband modem.

BACKGROUND

With the development of mobile communication technology, a user stores various pieces of information in a terminal and manages the pieces of information. Accordingly, if the terminal is lost, problems attributable to personal information distribution and the reuse of the terminal may occur.

In order to solve the problems, if a user sends a specific command to a lost terminal through a base station, the lost terminal autonomously deletes data stored in the lost terminal's flash memory in order to protect the user's personal information. Although the data stored in the flash memory is deleted, all chips included in the terminal may not be made in a fully impossible state because all the functions of the chips remain intact. If the functions of chips remain intact, a finder who picks up a lost terminal may recover the lost terminal because the lost terminal may be booted up and resell/reuse the lost terminal. In order to prevent such a problem, there is a need for technology in which chips are made in a fully impossible state in some cases.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a self-destruction method and apparatus in which a self-impossible state is autonomously entered if the baseband modem of a receiving terminal which supports mobile communication is necessary.

Another aspect of the present disclosure is to provide a method and apparatus for deleting information stored in memory when a command is received over a mobile communication network in which a baseband modem has been constructed and then entering a self-impossible state so that the terminal is not recovered although it is booted up again.

In accordance with an aspect of the present disclosure, a self-destruction method of a baseband modem is provided. The method includes sending a request for supplying power to a self-destruction unit to a power management unit when a command for performing the self-destruction is received from a base station and controlling the self-destruction unit to output a signal corresponding to a specific bit value. The signal output by the self-destruction unit is used to block a clock supplied from a TCXO to the baseband modem through a logical operation with a signal output by the TCXO.

An apparatus in accordance with an aspect of the present disclosure includes a baseband modem configured to support self-destruction, a power management unit configured to supply power to the baseband modem, and a TCXO configured to supply a clock to the baseband modem. The baseband modem includes a self-destruction unit configured to output a signal corresponding to a specific bit value for blocking the clock through a logical operation with a signal output by the TCXO and a control unit configured to send a request for supplying power to the self-destruction unit to the power management unit when a command for performing the self-destruction is received from a base station and to control the self-destruction unit to output a signal corresponding to a specific bit value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
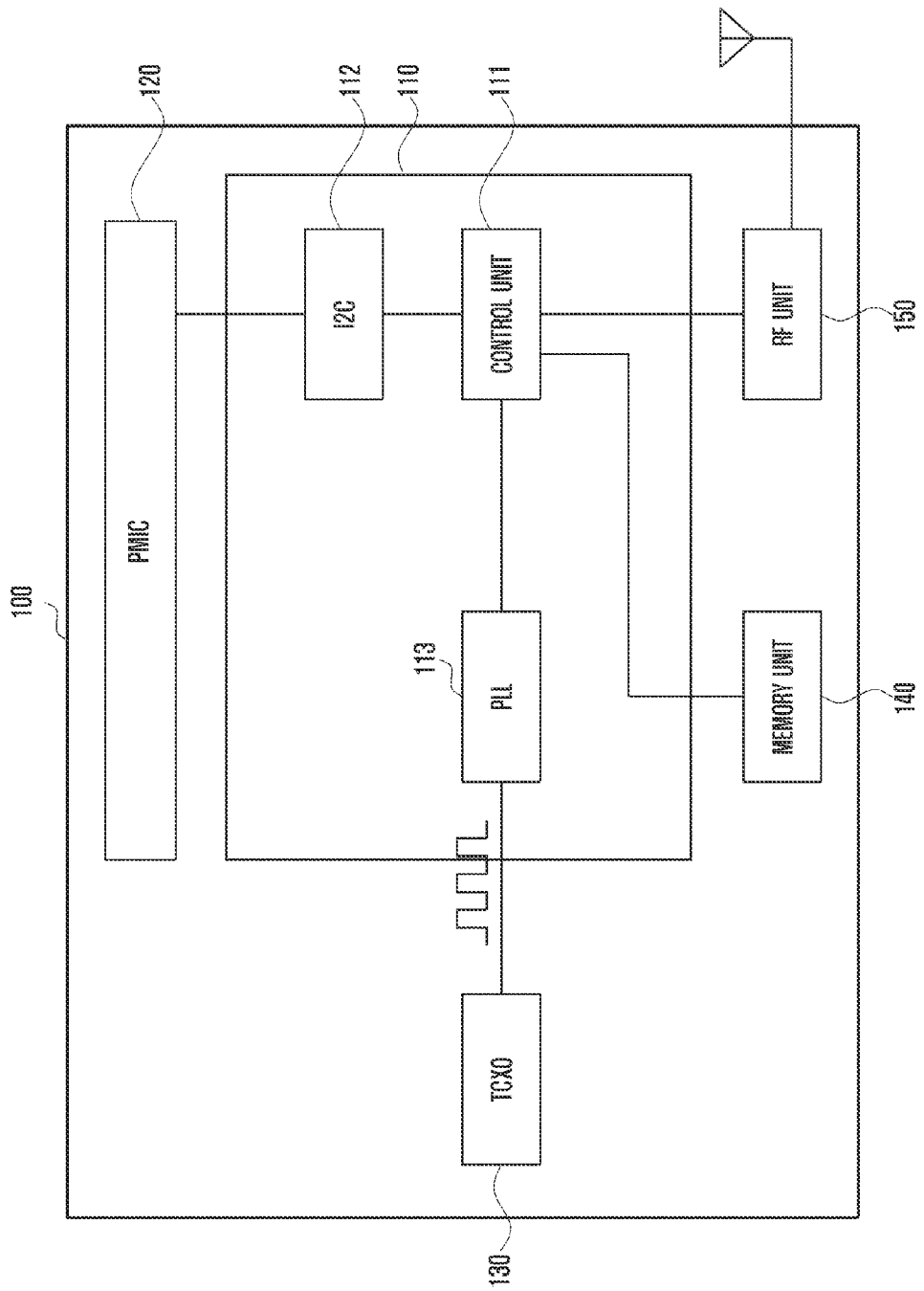
FIG. 1 is a block diagram showing the structure of a known apparatus including a baseband modem according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure are described in association with a terminal. The terminal may also be named as a mobile, a remote terminal, a mobile device, a user terminal, a wireless communication device, a user agent, a user device, or User Equipment (UE). The terminal may be a cellular phone, a Personal Digital Assistant (PDA), a handheld device having a wireless access ability, a computing device. Alternatively another processing device connected to a wireless modem.

It is to be noted that technical terms used in this specification are used to describe only specific various embodiments and are not intended to limit the scope of the present disclosure. Furthermore, the technical terms used in this specification should be construed as having meanings that are commonly understood by those skilled in the art to which the present disclosure pertains unless especially defined as different meanings in this specification and should not be construed as having excessively comprehensive meanings or excessively reduced meanings.

Furthermore, an expression of the singular number used in this specification includes an expression of the plural number unless clearly defined otherwise in the context. In this specification, terms, such as "comprise" and "include", should not be construed as essentially including several elements or several steps described in the specification.

Hereinafter, some various embodiments of the present disclosure are described with reference to the accompanying drawings. Furthermore, in describing the various embodiments of the present disclosure, a detailed description of known functions or constructions related to the present disclosure will be omitted if it is deemed that such description would make the gist of the present disclosure unnecessarily vague. Furthermore, terms to be described later are defined by taking the functions of various embodiments of the present disclosure into consideration, and may be different according to the operator's intention or usage. Accordingly, the terms should be defined based on the overall contents of the specification.

FIG. 1 is a block diagram showing the structure of a known apparatus including a baseband modem according to an embodiment of the present disclosure.

Referring to FIG. 1, a known apparatus 100 is configured to include a baseband modem 110. The baseband modem 110 may also be named as a baseband processor. The baseband modem 110 may perform a function for controlling the voice and data communication of the apparatus 100 and perform major functions for input and output between the apparatus 100 and a user using operation/control functions.

A control unit 111 manages an overall operation by controlling the elements of the baseband modem 110. An Inter-Integrated Circuit (I2C) 112 controls the supply of power by controlling a device external to the baseband modem 110, for example, a Power Management IC (PMIC) 120 under the control of the control unit 111. A Phase-Locked Loop (PLL) 113 is a frequency synthesizer and is configured to operate as a control loop for continuously supplying an output signal having the same phase and size as an input signal. The PLL 113 receives a source clock from an external Temperature-Compensated crystal Oscillator (TCXO) 130 and provides the control unit 111 with a clock having a specific cycle. The control unit 111 may perform a normal operation in response to power supplied by the PMIC 120 via the I2C 112 and a clock supplied by the TCXO 130 via the PLL 113.

The PMIC 120 supplies required power to each of the elements of the apparatus 100. The PMIC 120 may have a function for managing a total amount of power consumed by the apparatus 100 depending on implementations.

The TCXO 130 operates as a source for supplying a frequency for the apparatus 100. The TCXO 130 supplies a reference frequency and a source clock to the baseband modem 110 and RF unit 150 of the apparatus 100. The TCXO 130 may adopt temperature compensation techniques of various methods in order to prevent the deterioration of characteristics of the apparatus 100 that is attributable to a temperature change and a change in the frequency of other surrounding environments while the apparatus 100 operates.

A memory unit 140 may store data (e.g., an Operation System (OS) that enables the apparatus 100 to be booted up) for the apparatus 100. In various embodiments, the memory unit 140 may be provided separately from the baseband modem 110 as shown in FIG. 1 or may be provided within the baseband modem 110. Alternatively, the memory unit 140 may be provided both inside and outside the baseband modem 110. The memory unit 140 may include at least one of a flash memory type, a hard disk type, a multimedia card micro type, card type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, and an optical disk, but is not limited thereto.

The RF unit 150 performs data communication with the outside of the apparatus 100 under the control of the control unit 110. The RF unit 150 may perform data communication with, for example, a base station. The RF unit 150 may modulate an external signal into a signal of a low frequency band (i.e., a baseband) that may be processed by the baseband modem 110 or may modulate a signal of a low frequency, processed by the baseband modem 110, into a signal of a high frequency and send the signal of a high frequency.

Figure 2:
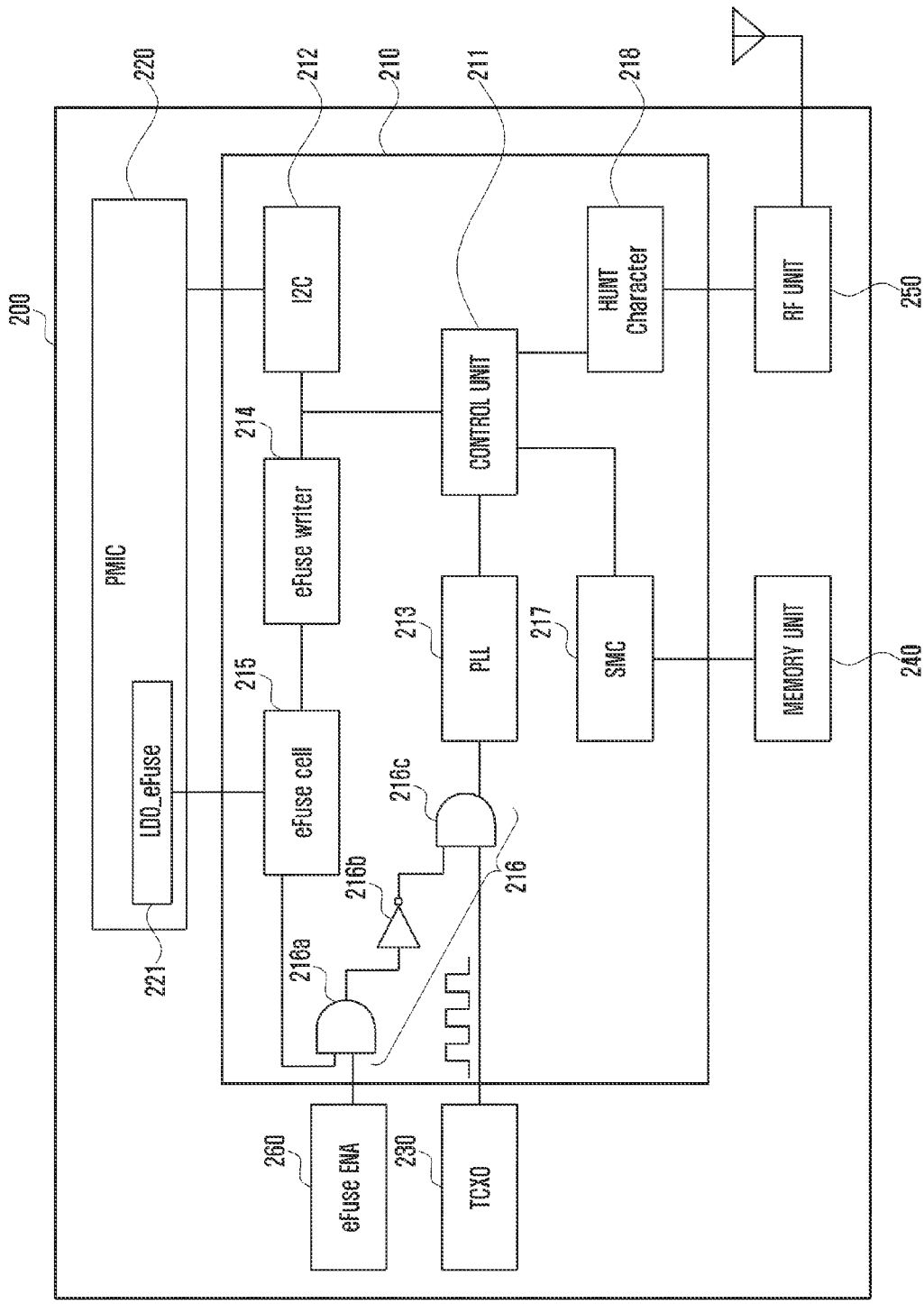
FIG. 2 is a block diagram showing the structure of an apparatus including a baseband modem according to an embodiment of the present disclosure.

FIG. 2 is a block diagram showing the structure of an apparatus including a baseband modem according to an embodiment of the present disclosure.

Referring to FIG. 2, an apparatus 200 in accordance with an embodiment of the present disclosure is configured to include a baseband modem 210. The baseband modem 210 is configured to include a control unit 211, an I2C 212, and a PLL 213.

The control unit 211 manages an overall operation by controlling the elements of the baseband modem 210. In accordance with an embodiment of the present disclosure, when a self-destruction command is received from a base station through a HUNT character 218, the control unit 211 may request a PMIC 220 to supply power to an eFuse cell 215 by controlling the I2C 212. Furthermore, the control unit 211 may control an eFuse writer 214 so that a specific bit of the eFuse cell 215 is set to a bit value for controlling the baseband modem 210 in a self-destruction state. The control unit 211 may manage and delete data stored in a memory unit 240 by controlling a Static Memory Controller (SMC) 217. A more detailed operation of the control unit 211 is described later.

The I2C 212 controls the supply of power by controlling a device external to the baseband modem 210, for example, the PMIC 220 under the control of the control unit 212. The PLL 213 is a frequency synthesizer and is configured to operate as a control loop for continuously supplying an output signal having the same phase as an input signal. In accordance with an embodiment of the present disclosure, the PLL 213 receives a signal from an eFuse logic circuit 216 as a source clock and supplies the control unit 211 with a clock having a specific cycle. The control unit 211 may perform a normal operation in response to power supplied by the PMIC 220 via the I2C 212 and a clock supplied by the TCXO 230 via the PLL 213. The baseband modem 210 in accordance with an embodiment of the present disclosure is configured to include the eFuse writer 214 and the eFuse cell 215.

The eFuse writer 214 sets a specific bit, stored in the eFuse cell 215, to a bit value for controlling the baseband modem 210 in a self-destruction state under the control of the control unit 211. In one embodiment, when a signal for controlling the self-destruction state is received from the control unit 211, the eFuse writer 214 may set a specific bit of the eFuse cell 215 as '1'. The bit value for controlling the baseband modem 210 in the self-destruction state may be previously set by the manufacturer of the apparatus 200 and may be, for example, a binary value of 1 bit, such as '1'. The specific bit value set in the eFuse cell 215 is a one-off value and thus may not be externally changed after it is set.

The eFuse cell 215 externally outputs a specific bit value set by the eFuse writer 214. In one embodiment, if a specific bit value of the eFuse cell 215 is set as '1' by the eFuse writer 214, the eFuse cell 215 may output a signal corresponding to the bit value '1'.

The signal output by the eFuse cell 215 is input to a first AND gate 216a for receiving a signal output by the eFuse cell 215 and a signal output by an eFuse ENA 260 as its input. The first AND gate 216a performs an AND operation based on the signal output by the eFuse cell 215 and the signal output by the eFuse ENA 260 and outputs a signal corresponding to a result of the operation. The signal output by the first AND gate 216a is input to a NOT gate 216b. The NOT gate 216b inverts the input signal and outputs an inverted signal. The inverted signal output by the NOT gate 216b is input to a second AND gate 216c for receiving the signal output by the NOT gate 216b and a signal output by the TCXO 230 as its input. The second AND gate 216c performs an AND operation based on the signal output by the NOT gate 216b and the signal output by the TCXO 230 and outputs a signal corresponding to a result of the operation. The signal output by the second AND gate 213c is supplied to the PLL 213, thus acting as a clock for the control unit 211.

The eFuse cell 215 may be supplied with power from the PMIC 220. To this end, the control unit 211 may control the PMIC 220 through the I2C 212 so that the PMIC 220 supplies power to the eFuse cell 215. The PMIC 220 may additionally include an LDO_eFuse 221 for supplying power to the eFuse cell 215.

The baseband modem 210 in accordance with an embodiment of the present disclosure is configured to further include the SMC 217 and the HUNT character 218.

The SMC 217 operates as an interface for controlling the memory unit 240 provided inside or outside the baseband modem 210. In various embodiments, if an additional interface for controlling the memory unit 240 is not necessary, the SMC 217 may be omitted. In accordance with an embodiment of the present disclosure, the SMC 217 may perform control for deleting data stored in the memory unit 240 under the control of the control unit 211.

The HUNT character 218 performs a function for detecting a self-destruction command received through an RF unit 250 and sending the self-destruction command to the control unit 211. When the self-destruction command is received from a base station through the RF unit 250, the HUNT character 218 may detect the self-destruction command and send the self-destruction command to the control unit 211 in an interrupt form. In various embodiments, if the control unit 211 directly detects the self-destruction command, the HUNT character 218 may be omitted.

The PMIC 220 supplies required power to each of the elements of the apparatus 200. The PMIC 220 may control the supply of power in response to a command from the control unit 211 that is received through the I2C 212.

In accordance with an embodiment of the present disclosure, the PMIC 220 may be configured to include the LDO_eFuse 221 for supplying power to the eFuse cell 215. When a command that supplies power to the eFuse cell 215 is received from the control unit 211 through the I2C 212, the PMIC 220 supplies power to the eFuse cell 215 through the LDO_eFuse 221.

The TCXO 230 operates as a source for supplying a frequency for the apparatus 200. The TCXO 230 supplies a reference frequency and a source clock to the baseband modem 210 and RF unit 250 of the apparatus 100. The TCXO 230 may adopt temperature compensation techniques of various methods in order to prevent the deterioration of characteristics of the apparatus 100 that is attributable to a temperature change and a change in the frequency of other surrounding environments while the apparatus 100 operates.

The memory unit 240 may store data (e.g., an OS that enables the apparatus 200 to be booted up) for the apparatus 200. In various embodiments, the memory unit 240 may be provided separately from the baseband modem 210 as shown in FIG. 2 or may be provided within the baseband modem 210. Alternatively, the memory unit 240 may be provided both inside and outside the baseband modem 210. The memory unit 240 may include at least one of a flash memory type, a hard disk type, a multimedia card micro type, card type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, and an optical disk.

The RF unit 250 performs data communication with the outside of the apparatus 200 under the control of the control unit 210. The RF unit 250 may perform data communication with, for example, a base station. The RF unit 250 may modulate an external signal into a signal of a low frequency band (i.e., a baseband) that may be processed by the baseband modem 210 or may modulate a signal of a low frequency, processed by the baseband modem 210, into a signal of a high frequency and send the signal of a high frequency.

In accordance with an embodiment of the present disclosure, the RF unit 250 may receive various control commands, for example, the self-destruction command from a base station, modulate the control command into a signal of a low frequency band that may be processed by the baseband modem 210, and send the signal of a low frequency band to the control unit 211.

The baseband modem 210 in accordance with an embodiment of the present disclosure may be configured to further include an eFuse ENA 260. The eFuse ENA 260 performs a function for turning on or off whether or not to supply a self-destruction function to the apparatus 200. The turn-on or -off function for determining whether or not to supply the self-destruction function may be determined in response to a user's input to the apparatus 200 or a message received from a base station.

In order to control the turn-on or -off function, the eFuse ENA 260 outputs a signal to the first AND gate 216a connected to the eFuse cell 215. When the turn-on or -off function for determining whether or not to supply the self-destruction function is determined to be on by the apparatus 200, the eFuse ENA 260 receives a pull-up signal. When the pull-up signal is received, the eFuse ENA 260 outputs a signal corresponding to the same value set to be identical with a value output by the eFuse cell 215 when the self-destruction command is executed. Accordingly, the self-destruction function in accordance with an embodiment of the present disclosure may be performed because the first AND gate 216a outputs a signal corresponding to the same value as that output by the eFuse cell 215 through the AND operation. In contrast, when the turn-on or -off function for determining whether or not to supply the self-destruction function is determined to be off by the apparatus 200, the eFuse ENA 260 does not receive the pull-up signal. In such a case, when the self-destruction function is performed, the eFuse ENA 260 outputs a signal corresponding to a value different from a value set to be output by the eFuse cell 215. Accordingly, the self-destruction function in accordance with an embodiment of the present disclosure may not be performed because the first AND gate 216a outputs a signal corresponding to a value different from a value output by the eFuse cell 215 through the AND operation.

In various embodiments, if the function for turning on or off the self-destruction function is not provided, the eFuse ENA 260 may be omitted.

In a state in which the self-destruction function has been controlled so that it has been on and the pull-up signal has been send to the eFuse ENA 260, when the self-destruction command is received from a base station, the control unit 211 controls the I2C 212 so that power is supplied from the LDO_eFuse 221 to the eFuse cell 215. If a value for controlling the baseband modem 210 so that it enters the self-destruction state is set as '1', the control unit 211 controls the eFuse writer 214 so that it outputs a signal corresponding to '1' to the eFuse cell 215. '1' output by the eFuse cell 215 and '1' output by the eFuse ENA 260 are input to the first AND gate 216a, and the first AND gate 216a outputs a signal corresponding to '1' based on a result of its AND operation. The NOT gate 216b receives '1' and outputs a signal corresponding to an inverted signal of '0'. The TCXO 230 outputs a clock signal, such as '101010, . . . ,' in order to provide a periodic clock. The second AND gate 216c performs an AND operation based on '0' output by the NOT gate 216b and the clock signal '101010, . . . ,' output by the TCXO 230. In this case, the second AND gate 216c outputs the signal '0' because the NOT gate 216b continues to output the signal '0'. The PLL 213 sends the signal '0', output by the second AND gate 216c, to the control unit 211. As a result, the periodic clock signal send by the TCXO 230 is blocked, and thus the control unit 211 to which the clock signal is not provided, does not normally operate. In accordance with the aforementioned operation, a value set in the eFuse cell 215 may not be changed in response to external input, and the control unit 211 to which a clock is not provided may not perform a normal operation. Accordingly, the baseband modem 210 becomes the self-destruction state.

In various embodiments, in order to implement the baseband modem 210, elements including the eFuse logic circuit 216 may be replaced with other elements or a different structure or may be omitted. For example, if the same results as those of the aforementioned bit operation may be provided, the first AND gate 216a and the second AND gate 216c may be replaced with an OR gate or an XOR gate. Alternatively, if the same results as those of the aforementioned bit operation may be provided, the NOT gate 216b may be omitted. To this end, for example, the structure of an apparatus including a baseband modem in accordance with another embodiment of the present disclosure is described in detail below with reference to FIG. 4.

A method in which the apparatus 200 including the baseband modem 210 in accordance with an embodiment of the present disclosure performs the self-destruction function of the baseband modem is described below with reference to FIG. 3.

Figure 3:
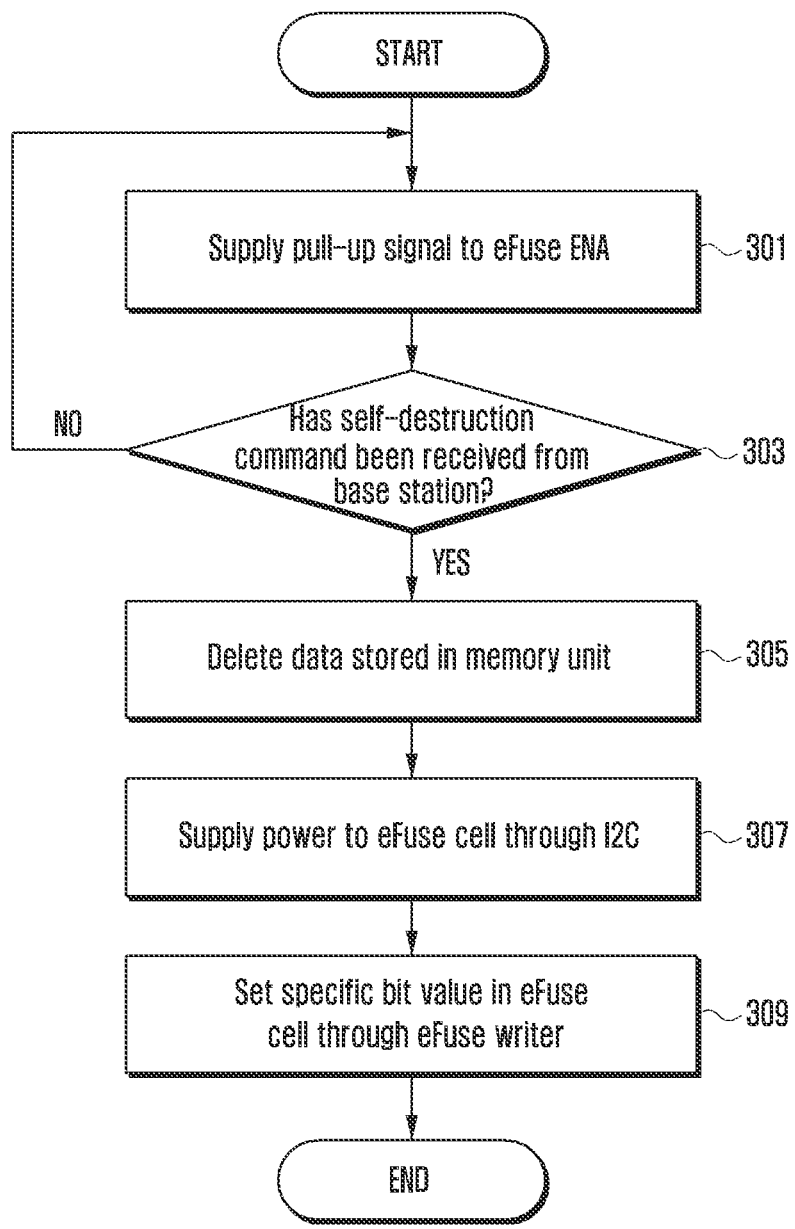
FIG. 3 is a flowchart illustrating a method of supporting the self-destruction function of the baseband modem according to an embodiment of the present disclosure.

FIG. 3 is a flowchart illustrating a method of supporting the self-destruction function of the baseband modem according to an embodiment of the present disclosure.

Referring to FIG. 3, the method of supporting the self-destruction function in accordance with an embodiment of the present disclosure is started by supplying the pull-up signal to the eFuse ENA at operation 301.

The apparatus 200 controls the self-destruction function of the baseband modem 210 so that the self-destruction function is in the turn-on state. If the self-destruction function of the baseband modem 210 is controlled so that it is in the turn-off state, the self-destruction function to be described later may not be performed. The function for turning on or off the self-destruction function may be determined in response to a user's input or a message received from a base station.

If the self-destruction function of the baseband modem 210 is controlled so that it is in the turn-on state, the pull-up signal is sent to the eFuse ENA 260 through the control unit 211 of the apparatus 200. When the pull-up signal is received, the eFuse ENA 260 outputs a signal corresponding to the same value as that set so that the value is output by the eFuse cell 215 when performing the self-destruction function. For example, the eFuse cell 215 may output a signal corresponding to '1'.

The control unit 211 determines whether or not the self-destruction command has been received from a base station at operation 303.

The RF unit 250 performs data communication with the base station, modulates the signal, received from the base station, into a signal of a baseband, and sends the signal of the baseband to the HUNT character 218. The HUNT character 218 determines whether or not the self-destruction command has been received from the base station based on the received signal. If, as a result of the determination, it is determined that the self-destruction command has been received, the HUNT character 218 sends the self-destruction command to the control unit 211 in an interrupt form.

The self-destruction command may be sent from the base station to the apparatus 200 in a situation in which the self-destruction function is necessary owing to a reason, such as a loss of the apparatus 200. The self-destruction command is a term for denoting the signal sent from the base station to the apparatus 200 and is only an example. The self-destruction command may also be named as an emasculation command or an impossible-state entry command. Furthermore, the self-destruction command may be transmitted through an existing message format or a newly defined message format. The self-destruction command may be transmitted over a public network or the private network of a service provider which provides network service to the apparatus 200. A format, a method, etc. in which the self-destruction command is sent are not specially limited.

When the self-destruction command is received, the control unit 211 may delete data stored in the memory unit depending on an embodiment of the present disclosure at operation 305.

The control unit 211 sends a command for deleting data stored in the memory unit to the SMC 217. The SMC 217 initializes the memory unit or sends a command for deleting data stored in the memory unit so that all the data stored in the memory unit is deleted.

Thereafter, the control unit 211 performs control so that power is supplied to the eFuse cell 215 through the I2C 212 at operation 307. The control unit 211 controls the I2C 212 so that the I2C 212 sends a request for the supply of power to the eFuse cell 215 to the PMIC 220. The I2C 212 requests the supply of power to the eFuse cell 215 from the PMIC 220 under the control of the control unit 211, and the PMIC 220 controls the LDO_eFuse so that power is supplied to the eFuse cell 215.

Furthermore, the control unit 211 performs control so that a specific bit for the self-destruction function is set in the eFuse cell 215 through the eFuse writer at operation 309. The control unit 211 controls the eFuse writer so that it writes the specific bit for the self-destruction function in the eFuse cell 215. For example, the control unit 211 may control the eFuse writer so that it writes a value of '1' in the eFuse cell 215.

When power is supplied to the eFuse cell 215 and a signal corresponding to the value set in the eFuse cell 215 is output according to the aforementioned control, a clock supplied to the control unit 211 is blocked through the eFuse logic circuit. As a result, the clock is not supplied to the control unit 211 according to the aforementioned operation, and thus the control unit 211 enters the self-destruction state because it does not perform a normal operation.

For example, when the eFuse cell 215 outputs a signal corresponding to '1' and the eFuse ENA 260 outputs a signal corresponding to '1', the first AND gate 216a outputs a signal corresponding to '1' through its AND operation. The NOT gate 216b receives the signal corresponding to '1' from the first AND gate 216a and outputs a signal corresponding to '0', that is, an inverted signal. The second AND gate 216c performs an AND operation based on a periodic clock signal '101010, . . . ,' output by the TCXO 230 and the signal output by the NOT gate 216b and continues to output a signal corresponding to '0'. The PLL receives the signal from the second AND gate 216c and sends the received signal to the control unit 211. The control unit 211 does not perform a normal operation because it is supplied with a signal corresponding to '0' not a clock signal, thus entering the self-destruction state.

Figure 4:
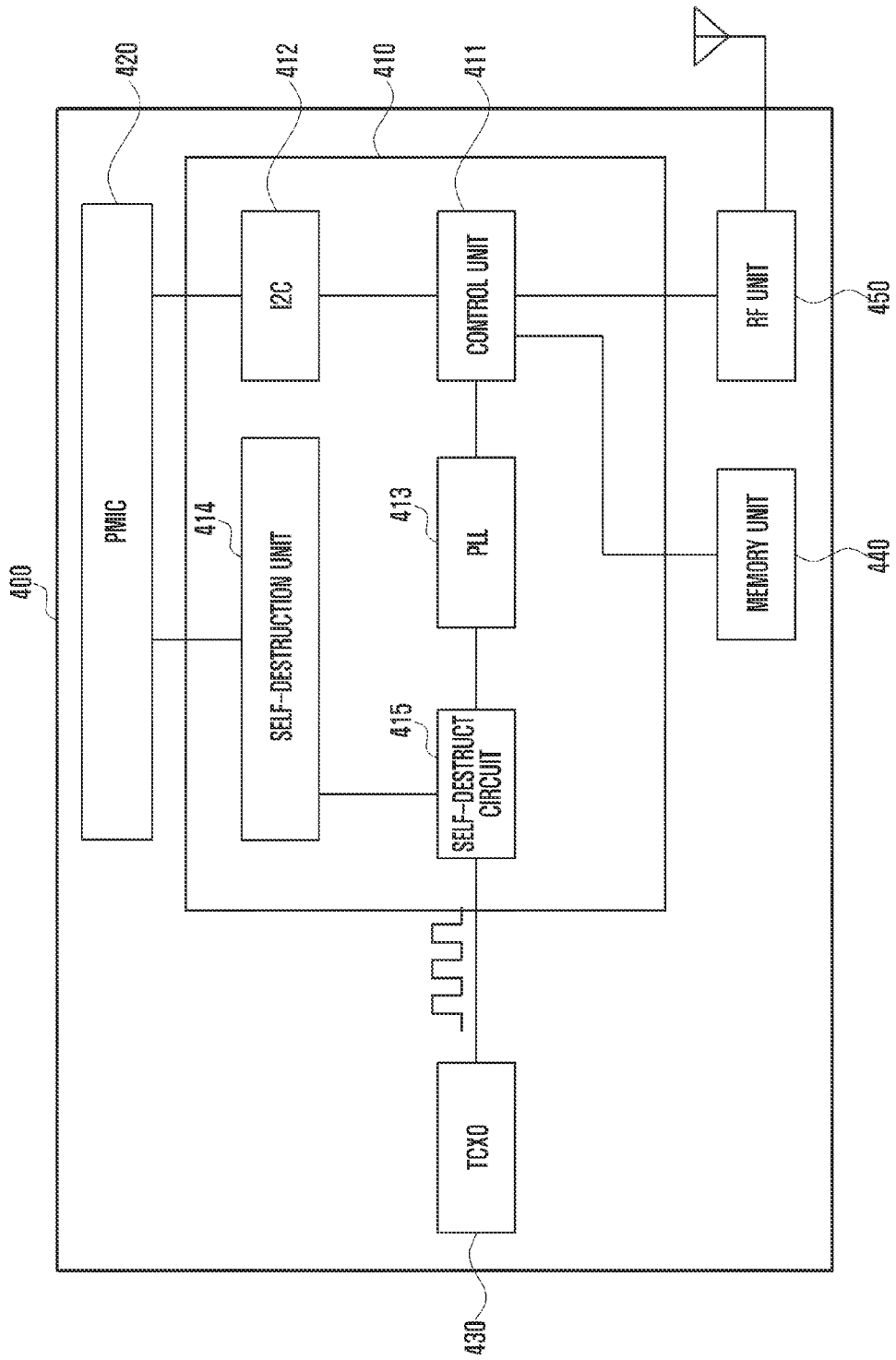
FIG. 4 is a block diagram showing the structure of an apparatus including a baseband modem according to another embodiment of the present disclosure.

FIG. 4 is a block diagram showing the structure of an apparatus including a baseband modem according to another embodiment of the present disclosure.

Referring to FIG. 4, an apparatus 400 is configured to include a baseband modem 410 in accordance with another embodiment of the present disclosure. The baseband modem 410 is configured to include a control unit 411, an I2C 412, and a PLL 213. A detailed operation of the control unit 411, the I2C 412, and the PLL 213 is the same as that described with reference to FIG. 2.

The baseband modem 410 in accordance with another embodiment of the present disclosure is configured to include a self-destruction unit 414 and a self-destruction logic circuit unit 415.

The self-destruction unit 414 may correspond to the eFuse writer 214 and the eFuse cell 215 in the embodiment of FIG. 2. The self-destruction unit 414 outputs a signal corresponding to a specific bit that blocks a clock supplied to the PLL 413 through a specific logical operation with a signal output by a TCXO 430 through a self-destruction logic circuit unit 415. The specific bit that blocks the clock may be determined depending on a construction of the self-destruction logic circuit unit 415. Alternatively, the specific bit that blocks the clock may be determined may be previously set when fabricating the apparatus 400. If the self-destruction unit 414 and the self-destruction logic 415 correspond to the eFuse writer 214, the eFuse cell 215, and the eFuse logic circuit 216 of FIG. 2, the specific bit that blocks the clock may be '1'.

The self-destruction logic circuit unit 415 may include a specific logic circuit for blocking the clock supplied to the PLL 413 through a logical operation of a signal output by the self-destruction unit 414 and a clock signal output by the TCXO 430. The self-destruction logic circuit unit 415 may correspond to the eFuse logic circuit 216 in the embodiment of FIG. 2.

The self-destruction unit 414 and the self-destruction logic circuit unit 415 may be modified in various forms without departing from the spirit of the present disclosure.

The apparatus 400 may be configured to include the TCXO 430, a memory unit 440, and an RF unit 450, which have been described in detail with reference to FIG. 2.

In accordance with the self-destruction method and apparatus of the baseband modem according to the various embodiments of the present disclosure, information within a specific terminal is deleted and the baseband modem is made in a recovery-impossible state in response to a command transmitted over an existing communication network when the terminal is lost or in an urgent situation. Accordingly, an attempt to information spill and the reuse or resell of a terminal may be blocked.

Those skilled in the art to which the present disclosure pertains will appreciate that the present disclosure may be implemented in other detailed forms without departing from the technical spirit or essential characteristics of the present disclosure. Accordingly, the aforementioned various embodiments should be constructed as being only illustrative not as being restrictive from all aspects.

While the present disclosure has been shown and described with reference to various embodiments thereof, it will be understood by those skilled in the art that various changes in form and details may be made therein without departing from spirit and scope of the present disclosure as defined by the appended claims and their equivalents.

What is claimed is:

1. A self-destruction method of a baseband modem, the method comprising:
   sending a request for supplying power to a self-destruction unit to a power management unit when a command for performing self-destruction is received from a base station; and
   controlling the self-destruction unit to output a signal corresponding to a specific bit value,
   wherein the signal output by the self-destruction unit is used to block a clock, supplied from a Temperature-Compensated crystal Oscillator (TCXO) to the baseband modem, through a logical operation with a signal output by the TCXO.

2. The self-destruction method of claim 1, further comprising receiving an output signal, formed by a logical operation of the signal output by the TCXO and the signal output by the self-destruction unit, from a Phase-Locked Loop (PLL).

3. The self-destruction method of claim 1, wherein the sending of the request for supplying power to the self-destruction unit to the power management unit comprises sending a command for sending the request to the power management unit to an Inter-Integrated Circuit (I2C).

4. The self-destruction method of claim 1, wherein the sending of the request for supplying power to the self-destruction unit to the power management unit comprises sending the request to the power management unit to control an LDO_eFuse to supply power to the self-destruction unit.

5. The self-destruction method of claim 1, wherein the controlling of the self-destruction unit comprises controlling an eFuse writer included in the self-destruction unit, the eFuse writer writing the specific bit value in the eFuse cell, and wherein the eFuse cell outputs the signal corresponding to the written specific bit value.

6. The self-destruction method of claim 1, wherein the controlling of the self-destruction unit comprises controlling the self-destruction unit to output the signal to a self-destruction logic circuit unit configured to perform the logical operation of the signal output by the TCXO and the signal output by the self-destruction unit.

7. The self-destruction method of claim 6, wherein the controlling of the self-destruction unit comprises controlling the self-destruction unit to perform a first AND operation based on a signal output by an eFuse ENA and the signal output by the self-destruction unit, to perform a NOT operation based on an output signal according to a result of the first AND operation, performs a second AND operation based on an output signal according to a result of the NOT operation and the signal output by the TCXO, and to output an output signal according to a result of the second AND operation.

8. The self-destruction method of claim 6, wherein the self-destruction logic circuit unit receives the signal output by an eFuse ENA configured to output a signal corresponding to an on or off state of the self-destruction.

9. The self-destruction method of claim 1, further comprising deleting data stored in a memory unit.

10. The self-destruction method of claim 9, wherein the deleting of the data stored in the memory unit comprises sending a control command to a Static Memory Controller (SMC) to delete the data stored in the memory unit.

11. The self-destruction method of claim 1, wherein the command for performing the self-destruction is received through a HUNT character.

12. An apparatus, comprising:
a baseband modem configured to support self-destruction;
a power management unit configured to supply power to the baseband modem; and
a Temperature-Compensated crystal Oscillator (TCXO) configured to supply a clock to the baseband modem,
wherein the baseband modem comprises:
a self-destruction unit configured to output a signal corresponding to a specific bit value for blocking the clock through a logical operation with a signal output by the TCXO; and
a control unit configured to control to send a request for supplying power to the self-destruction unit to the power management unit when a command for performing the self-destruction is received from a base station and to control the self-destruction unit to output a signal corresponding to the specific bit value.

13. The apparatus of claim 12, wherein the baseband modem further comprises a Phase-Locked Loop (PLL) configured to send an output signal, formed by a logical operation of the signal output by the TCXO and the signal output by the self-destruction unit, to the control unit.

14. The apparatus of claim 12, wherein the baseband modem further comprises an Inter-Integrated Circuit (I2C) configured to send the request to the power management unit.

15. The apparatus of claim 12, wherein the power management unit comprises an LDO_eFuse configured to supply power to the self-destruction unit.

16. The apparatus of claim 12, wherein the self-destruction unit comprises:
an eFuse cell configured to output a signal corresponding to the specific bit value; and
an eFuse writer configured to write the specific bit value in the eFuse cell.

17. The apparatus of claim 16, wherein the specific bit value set in the eFuse cell is a one-off value that is only set once in the apparatus.

18. The apparatus of claim 12, wherein the baseband modem further comprises:
an eFuse ENA configured to output a signal corresponding to an on or off state of the self-destruction; and
a self-destruction logic circuit unit configured to perform a logical operation based on the signal output by the self-destruction unit, the signal output by the TCXO, and the signal output by the eFuse ENA.

19. The apparatus of claim 18, wherein the self-destruction logic circuit unit comprises:
a first AND gate configured to perform a first AND operation based on the signal output by the eFuse ENA and the signal output by the self-destruction unit;
a NOT gate configured to perform a NOT operation based on a signal output by the first AND gate; and
a second AND gate configured to perform a second AND operation based on a signal output by the NOT gate and the signal output by the TCXO and send the output signal to the control unit.

20. The apparatus of claim 12, further comprising a memory unit configured to store data, wherein the control unit controls the memory unit to delete data stored in the memory unit if the command is received.

21. The apparatus of claim 12, wherein the baseband modem further comprises a HUNT character configured to send an interrupt signal to the control unit if a command for performing the self-destruction is received.

* * * * *